(12) United States Patent
Knoth

(10) Patent No.: US 12,311,594 B2
(45) Date of Patent: May 27, 2025

(54) PULSE CURE OF ULTRAVIOLET LIGHT CURABLE MATERIALS

(71) Applicant: University of Dayton Research Institute, Dayton, OH (US)

(72) Inventor: Samantha Knoth, Niceville, FL (US)

( * ) Notice: Subject to any disclaimer, the term of this patent is extended or adjusted under 35 U.S.C. 154(b) by 0 days.

(21) Appl. No.: 17/725,851

(22) Filed: Apr. 21, 2022

(65) Prior Publication Data

US 2022/0339860 A1 Oct. 27, 2022

Related U.S. Application Data

(60) Provisional application No. 63/177,780, filed on Apr. 21, 2021.

(51) Int. Cl.
*B29C 64/129* (2017.01)
*B29C 35/08* (2006.01)
(Continued)

(52) U.S. Cl.
CPC ........ *B29C 64/129* (2017.08); *B29C 35/0805* (2013.01); *B29C 64/264* (2017.08); *B33Y 10/00* (2014.12); *B29C 2035/0827* (2013.01)

(58) Field of Classification Search
CPC . B29C 64/129; B29C 35/0805; B29C 64/264; B29C 2035/0827; B29C 64/124;
(Continued)

(56) References Cited

U.S. PATENT DOCUMENTS 5,182,056 A * 1/1993 Spence ............... G03F 7/70416
118/712
5,840,239 A * 11/1998 Partanen ............... B29C 64/135
264/401
(Continued)

FOREIGN PATENT DOCUMENTS

CN 110831735 B * 12/2021 ........... B29C 64/124
JP 10156951 A * 6/1998
WO WO-2022136407 A1 * 6/2022

OTHER PUBLICATIONS

English translation of JP-10156951-A by EPO (OA Appendix). (Year: 1998).*
(Continued)

*Primary Examiner* — Timothy Kennedy
*Assistant Examiner* — Inja Song
(74) *Attorney, Agent, or Firm* — Thomas E. Lees, LLC

(57) ABSTRACT

A process for curing an ultraviolet curable material comprises setting initial conditions, such as an emitted irradiance of an ultraviolet source, an initial value for an exposure time, an initial value for a break time, a stopping condition, combinations thereof, etc. The process repeatedly performs an ultraviolet cure sequence to cure a material until the stopping condition is met, where each iteration in the ultraviolet cure sequence comprises irradiating the material with the ultraviolet source at the emitted irradiance for the exposure time, and resting for the break time with no irradiation applied to the material. In some embodiments, the process adjusts a value of at least one of the emitted irradiance, the exposure time, or the break time in at least one iteration of the ultraviolet cure sequence. For instance, in some embodiments, the exposure time is adjusted, e.g., by a fixed amount, according to a gradient, etc.

15 Claims, 6 Drawing Sheets

(51) Int. Cl.
*B29C 64/264* (2017.01)
*B33Y 10/00* (2015.01)

(58) Field of Classification Search
CPC ... B29C 64/268; B29C 64/273; B29C 64/282; B29C 64/12; B33Y 10/00
See application file for complete search history.

(56) References Cited

U.S. PATENT DOCUMENTS

| | | | |
|---|---|---|---|
| 6,001,297 A * | 12/1999 | Partanen | B29C 64/135 |
| | | | 264/401 |
| 6,126,884 A * | 10/2000 | Kerekes | B33Y 10/00 |
| | | | 425/375 |
| 6,399,010 B1 * | 6/2002 | Guertin | B29C 64/135 |
| | | | 425/375 |
| 2012/0128890 A1 | 5/2012 | Mirchev | |
| 2018/0009162 A1 * | 1/2018 | Moore | B33Y 70/00 |
| 2018/0079148 A1 * | 3/2018 | Deak | B29C 64/386 |

OTHER PUBLICATIONS

English translation of CN-110831735-B. (Year: 2021).*
Choi, J., Wicker, R.B., Cho, S., Ha, C. and Lee, S. (2009), "Cure depth control for complex 3D microstructure fabrication in dynamic mask projection microstereolithography", Rapid Prototyping Journal, vol. 15 No. 1, pp. 59-70. https://doi.org/10.1108/13552540910925072 (Year: 2009).*

* cited by examiner

PULSE CURE OF ULTRAVIOLET LIGHT CURABLE MATERIALS

CROSS REFERENCE TO RELATED APPLICATIONS

This application claims the benefit of U.S. Provisional Patent Application Ser. No. 63/177,780 filed Apr. 21, 2021, entitled "PULSE CURE OF ULTRAVIOLET LIGHT CURABLE MATERIALS", the disclosure of which is hereby incorporated by reference.

STATEMENT REGARDING FEDERALLY SPONSORED RESEARCH OR DEVELOPMENT

This invention was made with government support under FA8651-15-2-0003 awarded by the Air Force Research Laboratory. The government has certain rights in the invention.

BACKGROUND

Aspects of the present disclosure relate generally to curing ultraviolet (UV) curable composite materials, and particularly, to pulse cure techniques for increasing a depth of cure of UV curable composite materials.

Ultraviolet (UV) curing uses ultraviolet light to initiate a photochemical reaction in a material that contains a photo-initiator. Essentially, polymerization is initiated by breaking down the photo-initiator into functional groups through absorption of UV light. The reaction causes the material to form a polymer, can thus be utilized for curing or drying inks, coatings, adhesives, etc., and thus has the effect to harden the material.

BRIEF SUMMARY

According to aspects of the present disclosure, a process for curing an ultraviolet curable material comprises setting initial conditions. For instance, the process can comprise setting an initial value for an emitted irradiance (UV intensity) of an ultraviolet source, setting an initial value for an exposure time, setting an initial value for a break time, setting a stopping condition, combinations thereof, etc. The process further comprises repeatedly performing an ultraviolet cure sequence to cure a material until the stopping condition is met, where each iteration in the ultraviolet cure sequence comprises irradiating the material with the ultraviolet source at the emitted irradiance for the exposure time, and resting for the break time with no irradiation applied to the material.

In some embodiments, the process further comprises adjusting a value of at least one of the emitted irradiance, the exposure time, or the break time in at least one iteration of the ultraviolet cure sequence. For instance, in some embodiments, the exposure time is adjusted by a fixed amount, optionally at each iteration. Other example embodiments comprise adjusting the exposure time according to a gradient, a step function, a formula, or other determinable interval. In some embodiments, for each iteration, the exposure time goes up. In other embodiments, for each iteration, the exposure time goes down.

The above techniques can also be applied to changes to the emitted irradiance and/or break time. In yet other embodiments, any combination of emitted irradiance, exposure time, and break time can be adjusted at each interval.

In still further embodiments, the above iterative process is combined with conventional cure techniques to increase the depth of cure beyond what the conventional cure technique alone, could realize.

DETAILED DESCRIPTION

Figure 1:
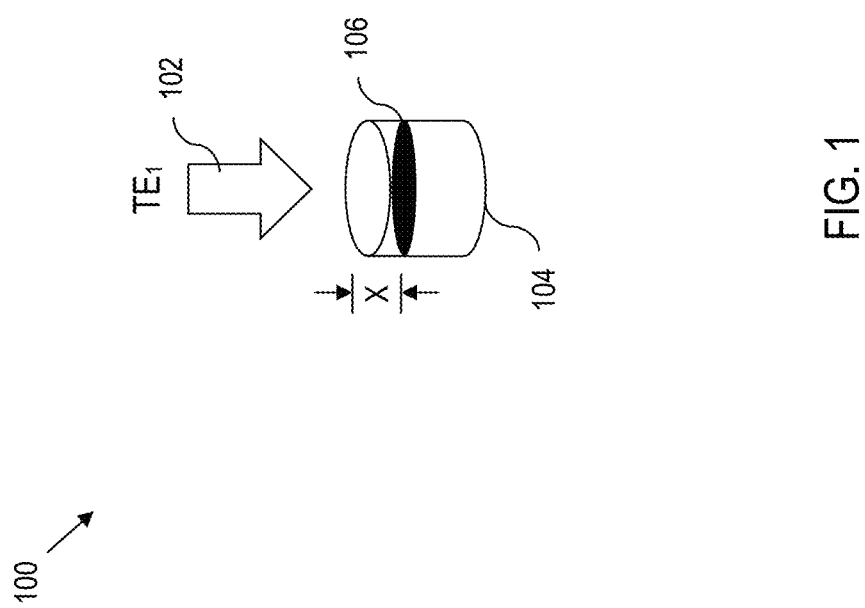
FIG. 1 is schematic diagram of a single iteration ultraviolet light cure process, according to aspects of the present disclosure.

Aspects of the present disclosure relate generally to curing ultraviolet curable composite materials, and particularly, to cure techniques including pulse cure techniques for increasing a depth of cure of UV curable composite materials.

Aspects herein provide a pulse cure technique that can serve as an alternative cure method compared to conventional continuous curing approaches for ultraviolet curable composite materials, such as UV-curable bulk filled resin composites. In this regard, the pulse cure technique herein can result in an increased or otherwise improved depth of cure, a reduced exposure time needed to cure the material of interest to achieve a comparable level of depth of cure, an overall improvement in the resultant material quality and/or consistency, or combinations thereof.

In some embodiments, the pulse cure technique herein improves the depth of cure for a material over a conventional continuous cure method for the same duration of exposure time. In some embodiments, combining the pulse cure technique with a traditional continuous cure method is expected to result in improved depth of cure, a reduction in time needed to achieve that level of depth of cure, an overall improvement in resultant material, or combinations thereof.

Introduction to the Depth of Cure

A common problem with UV-curable material, e.g., bulk filled resin composites, is poor depth of cure. The depth of cure issues with composite materials is one of the limiting factors to scaling up the size of additively manufactured objects. Increasing the depth of cure can thus be enabling for scale-up printing processes. Moreover, if the depth of cure issues can be overcome, larger filament sizes are feasible and resulting printed objects could be orders of magnitude larger.

Depth of cure is also important for dental composite applications and/or applications that require the buildup of layers of material. For instance, increasing the depth of cure can assist in reducing an amount of interfaces needed in dental composites. An increased depth of cure can result in less opportunities for composite failure at the internal layer interfaces as fewer layer interfaces would be present in the printed material.

By way of illustration and not by way of limitation, an example application may include a process parameter that dictates an objective to cure X millimeter (mm) thickness, where X is any integer (e.g., 10 mm thickness) on a reasonable time scale. Ten millimeters is a good starting point for exploring printing of composite materials at larger dimensions, but practically, a cure beyond 10 mm may be achievable.

Additive Manufacturing

A current problem with depth of cure of additively manufactured composite materials is that the cure can be insufficient for the printing tasks. Insufficient cure limits a print size of the material printed. Moreover, a partially uncured layer may not be able to support the weight of additional printed layers. Further, an insufficient cure may also result in a reduction in quality of print due to uncured material slumping, which can make the print become outside of a desired tolerance. In addition, this slumping limits the unique shapes or geometries that can be built by using additive manufacturing techniques. These shapes or geometries are one of the main benefits of using an additive manufacturing approach over traditional processing techniques where those shapes or geometries are not otherwise feasible.

Aspects of the present disclosure address the above issues by providing an iterative ultraviolet cure sequence that utilizes and/or combines pulsed, gradient pulsed, or otherwise manipulated cure parameters to achieve a desired depth of cure, time of cure, or combinations thereof.

By way of introduction, pulse and/or gradient pulse cure techniques (as well as other techniques described herein) improve the depth of cure of materials, which improves the quality of print, the shapes or geometries that are feasible to print, and the overall size of the print possible. Such improvements are achieved by limiting or eliminating an amount of uncured material that would otherwise slump (where slumping causes the printed component to be out of tolerance). Pulse cure techniques herein thus provide a solid foundation for additional layers to be printed upon, thus making the techniques herein exceptionally well suited for additive manufacturing.

Factors such as emitted irradiance and exposure time of the composite material to the emitted UV light play an important role on the polymerization quality of the material, as the combination of these factors determine an amount of energy reaching a corresponding material to be cured. In this regard, a previously determined benchmark for dental composites considers that an energy of approximately sixteen (16) Joules per centimeter squared ($J/cm^2$) may be considered adequate to cure up to two (2) millimeter (mm) increments of conventional resin composite material. However, where a greater volume of material is required to be cured, the amount of energy required to achieve reasonable polymerization is currently unclear.

However, according to aspects of the present disclosure, a pulse cure technique is optionally paired with a design of experiments (DOE) approach to optimize a pulse sequence. This embodiment provides a method to address the dose issue for materials with varying dose requirements to achieve sufficient cure.

Example Embodiments

Referring now to the drawings, and in particular to FIG. 1, a schematic 100 represents a "crust" hypothesis. An ultraviolet light source is controlled to emit ultraviolet light having a designated irradiance 102 (energy intensity) represented by an arrow. The irradiance 102 is UV energy that irradiates a UV curable material 104 for a time designated by $TE_1$ (time of exposure), e.g., 60 seconds in an illustrative example. After the exposure, the material will achieve a cure depth designated by 106, at a depth of X millimeters (mm).

Additional examples will illustrate how the pulse cure techniques herein overcome the cure issue by delaying the cure at the surface allowing for deeper light penetration prior to full surface cure.

For instance, according to an aspect of the present disclosure, a process for curing an ultraviolet curable material comprises setting an initial value for an emitted irradiance of an ultraviolet source, setting an initial value for an exposure time, setting an initial value for a break time, setting a stopping condition, or any combination thereof. The process then repeatedly performing an ultraviolet cure sequence to cure a material until the stopping condition is met. After setting the process parameters, each iteration in the ultraviolet cure sequence comprises irradiating the material with the ultraviolet source at the emitted irradiance for the exposure time, and resting for the break time with no irradiation applied to the material.

As a few examples, the initial irradiance value can be affected by factors such as a lamp output power of the ultraviolet source, efficiency of any reflector system, distance to the surface of the material, etc. In this regard, UV irradiance characterizes the radiant power arriving at a surface of the material per unit area and is typically expressed in Watts or milliWatts per square centimeter. Correspondingly, UV effective energy is a time-integral of irradiance to which the surface of the material is exposed and is expressed in Joules or milliJoules per square centimeter. An example exposure time can range for any practical value. Illustrative examples include an exposure time from less than one second, to as much as sixty (60) seconds or higher for some applications. An example break time can also vary from less than one second to several seconds, e.g., five (5) seconds or more. An example stopping condition may be defined by a predetermined number of iterations, a predetermined amount of time, a desired depth of cure, etc.

Figure 2:
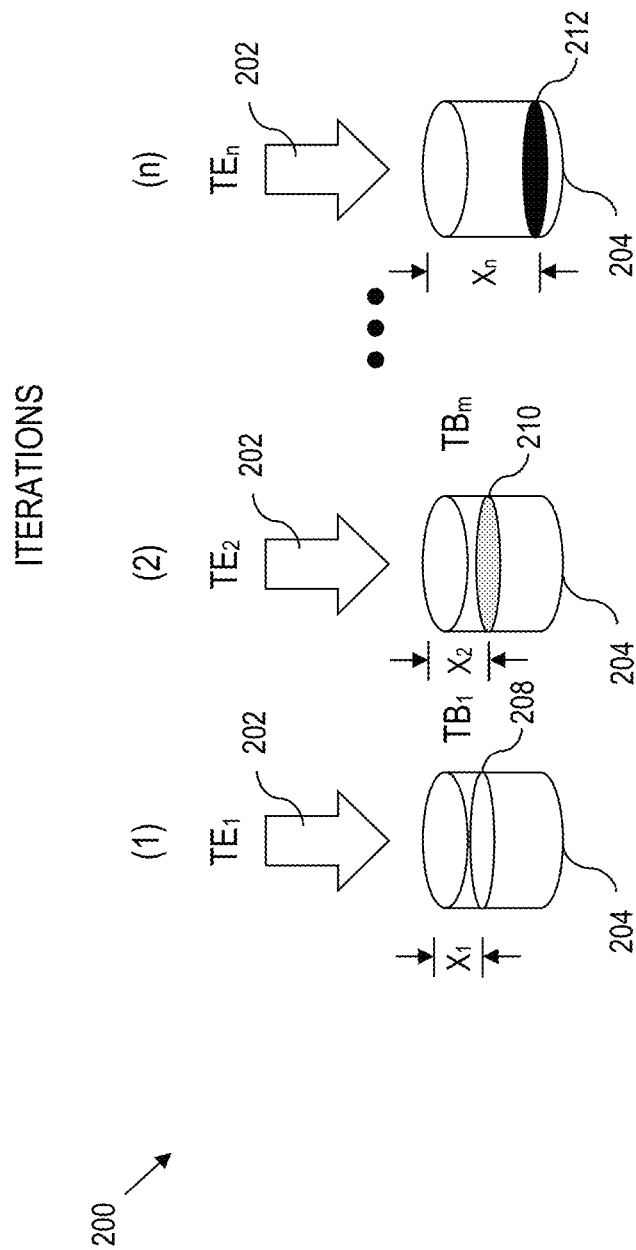
FIG. 2 is schematic diagram of a multiple iteration (pulsed) ultraviolet cure sequence, according to aspects of the present disclosure.

Referring to FIG. 2, an example schematic diagram illustrates a process 200 for curing an ultraviolet curable material, according to aspects of the present disclosure. Analogous to FIG. 1, ultraviolet irradiance is designated by a downward arrow 202 directed towards a material 204. After setting the initial values for emitted irradiance, exposure time, break time, the stopping condition, combinations thereof, etc., the process repeatedly performs an ultraviolet cure sequence to cure the material 202 until the stopping condition is met. Each iteration in the ultraviolet cure sequence comprises irradiating the material 204 with the ultraviolet source at the emitted irradiance for the exposure time (generally referred to in FIG. 2 as TE) and resting for the break time (generally referred to in FIG. 2 as TB) with no irradiation applied to the material 204.

More particularly, at the first iteration, the emitted irradiance 202 is directed towards the material 204 for an exposure time having a duration of TEL Here the material 204 continues curing even at a depth of $X_1$ designated by 208. The process then breaks for a break time $TB_1$ with no light irradiating the material 204 (e.g., the ultraviolet source turned off).

At the second iteration, the emitted irradiance 202 is directed towards the material 204 for an exposure time having a duration of $TE_2$. Here the material 204 continues curing even at a depth of $X_2$ designated by 210. The process then breaks for a break time $TB_2$ with no light irradiating the material 204 (e.g., the ultraviolet source turned off). The iterative process then repeats in an analogous manner.

At the $n^{th}$ iteration, the emitted irradiance 202 is directed towards the material 204 for an exposure time having a duration of $TE_n$. Here the material 204 continues curing even at a depth of $X_n$ designated by 212. Here, the stopping condition is met, so the final cure depth is $X_n$, where $X_n$ is greater than $X_2$, $X_1$. Moreover, $X_n$ is greater than X (FIG. 1).

In some embodiments, the values of the parameters do not change, such that at each iteration, the material is pulsed for a designated exposure time having a fixed duration of ultraviolet light at a designated irradiance, with a fixed break time.

In other embodiments, one or more of the parameters change at one or more iterations. For instance, the process can further comprise adjusting a value of at least one of the emitted irradiance, the exposure time, or the break time in at least one iteration of the ultraviolet cure sequence.

By way of illustration, the process can vary the exposure time at one or more iterations. As a few examples, the exposure time at each iteration can optionally be changed, e.g., based upon a predetermined, fixed amount, a predetermined gradient (high to low or low to high), according to a pre-programmed step function, according to a predetermined formula, etc.

In other embodiments, the irradiation (ultraviolet light intensity) changes using any of the techniques described above.

In yet other embodiments, the break time changes according to any of the above-described techniques.

In still other embodiments, at each iteration, any combination of emitted radiance value, exposure time value, or break time value can change, e.g., using any of the above-described techniques.

Figure 3:
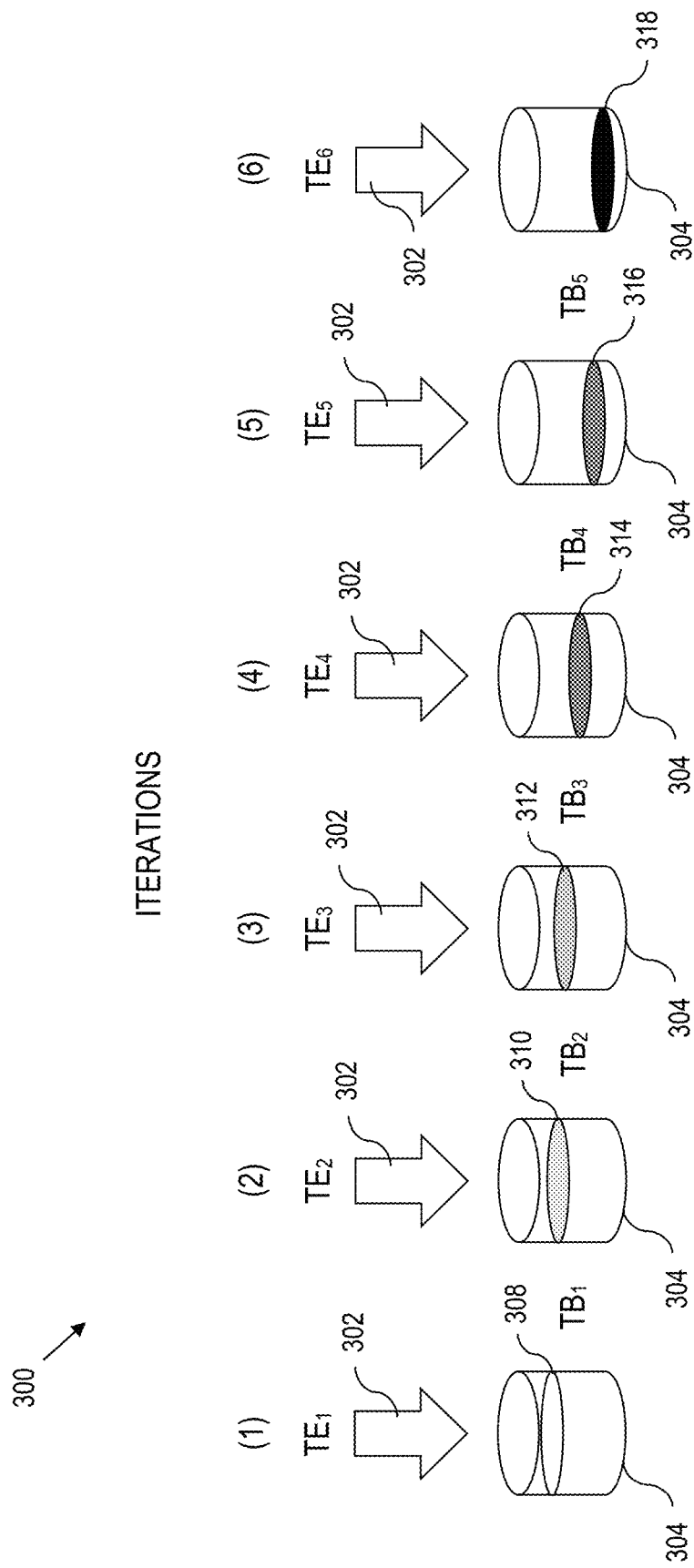
FIG. 3 is schematic diagram of multiple iteration (pulsed) ultraviolet cure sequence showing six intervals, according to aspects of the present disclosure.

Referring to FIG. 3, another schematic example implementation of a process 300 for curing an ultraviolet curable material is illustrated. Analogous to FIG. 2, ultraviolet irradiance is designated by a downward arrow 302 directed towards a material 304. After setting the initial values for emitted irradiance, exposure time, break time, the stopping condition, combinations thereof, etc., the process 300 repeatedly performs an ultraviolet cure sequence to cure the material 304 until the stopping condition is met. Each iteration in the ultraviolet cure sequence comprises irradiating the material 304 with the ultraviolet source at the emitted irradiance for the exposure time (TE) and resting for the break time (TB) with no irradiation applied to the material 304.

At interval 1, the material 304 is irradiated for an exposure time having a duration of $TE_1$, after which the material 304 continues curing even at a depth designated as 308. The process 300 then waits a break time $TB_1$ with no irradiation (e.g., ultraviolet source turned off).

At interval 2, the material 304 is irradiated for an exposure time of $TE_2$, after which the material 304 continues curing even at a depth designated as 310. The process 300 then waits a break time $TB_2$ with no irradiation (e.g., ultraviolet source turned off).

At interval 3, the material 304 is irradiated for an exposure time having a duration of $TE_3$, after which the material 304 continues curing even at a depth designated as 312. The process 300 then waits a break time $TB_3$ with no irradiation (e.g., ultraviolet source turned off).

At interval 4, the material 304 is irradiated for an exposure time having a duration of $TE_4$, after which the material 304 continues curing even at a depth designated as 314. The process 300 then waits a break time $TB_4$ with no irradiation (e.g., ultraviolet source turned off).

At interval 5, the material 304 is irradiated for an exposure time having a duration of $TE_5$, after which the material 304 continues curing even at a depth designated as 316. The process 300 then waits a break time $TB_5$ with no irradiation (e.g., ultraviolet source turned off).

At interval 6, the material 304 is irradiated for an exposure time having a duration of $TE_6$, after which the material 304 continues curing even at a depth designated as 318. The process 300 has reached the stopping condition so the process terminates, with a final cure depth 318.

In an example of using the process 300 of FIG. 3 in a pulsed application, the exposure time remains a constant value, e.g., 5 seconds, and the break time remains constant, e.g., 5 seconds. The emitted irradiance can also remain constant. In some embodiments, the emitted irradiance and/or the break time can vary as described more fully herein. Regardless, the cure depth 318 is greater than the depth 308. Moreover, the cure depth 318 is greater than the cure depth X (FIG. 1).

Figure 4:
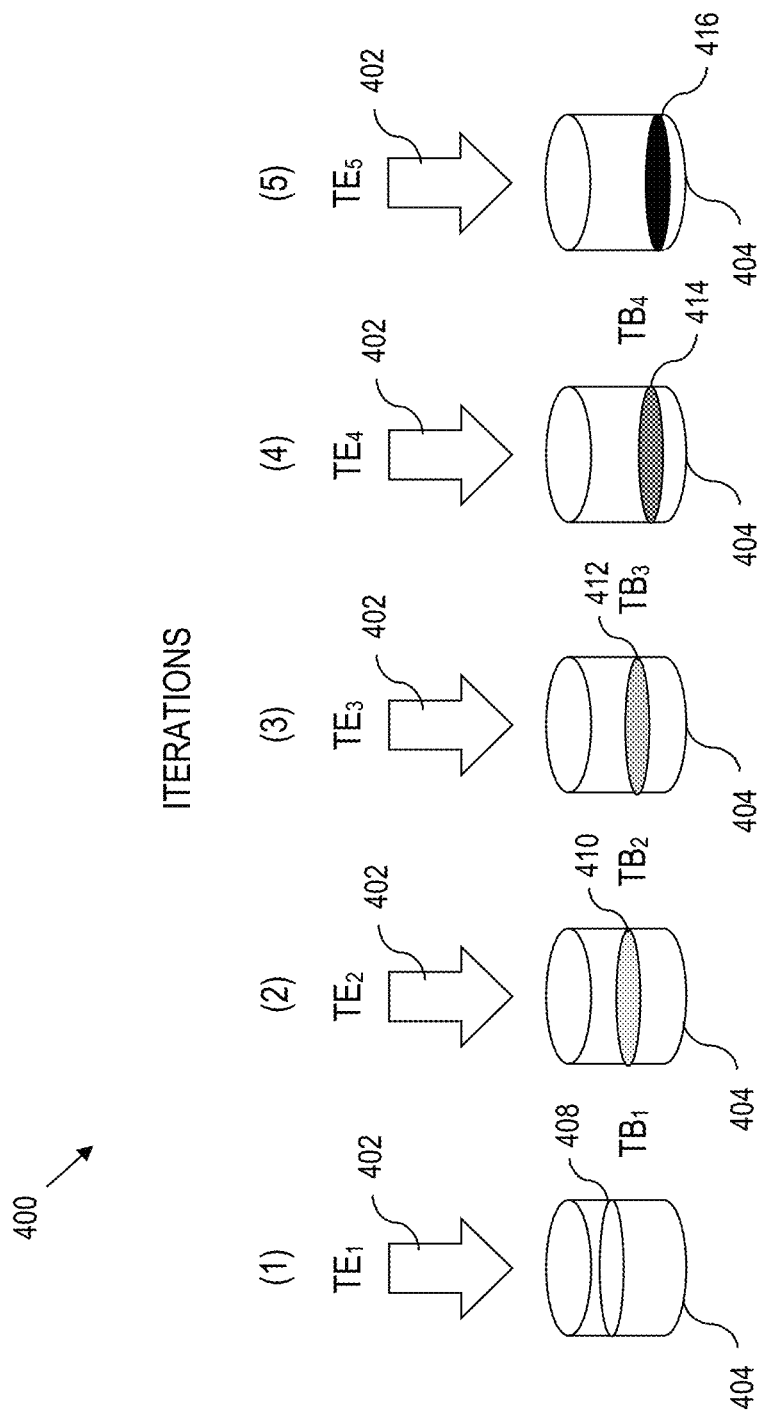
FIG. 4 is schematic diagram of a gradient pulse, multiple iteration ultraviolet cure sequence, according to aspects of the present disclosure.

Referring to FIG. 4, another schematic example implementation of a process 400 for curing an ultraviolet curable material is illustrated. Analogous to FIG. 3, ultraviolet irradiance is designated by a downward arrow 402 directed towards a material 404. After setting the initial values for emitted irradiance, exposure time, break time, the stopping condition, combinations thereof, etc., the process 400 repeatedly performs an ultraviolet cure sequence to cure the material 404 until the stopping condition is met. Each iteration in the ultraviolet cure sequence comprises irradiating the material 404 with the ultraviolet source at the emitted irradiance for the exposure time (TE) and resting for the break time (TB) with no irradiation applied to the material.

At interval 1, the material 404 is irradiated for an exposure time having a duration of $TE_1$, after which the material 404 continues curing even at a depth designated as 408. The process 400 then waits a break time $TB_1$ with no irradiation (e.g., ultraviolet source turned off).

At interval 2, the material 404 is irradiated for an exposure time having a duration of $TE_2$, after which the material 404 continues curing even at a depth designated as 410. The process 400 then waits a break time $TB_2$ with no irradiation (e.g., ultraviolet source turned off).

At interval 3, the material 404 is irradiated for an exposure time having a duration of $TE_3$, after which the material 404 continues curing even at a depth designated as 412. The process 400 then waits a break time $TB_3$ with no irradiation (e.g., ultraviolet source turned off).

At interval 4, the material 404 is irradiated for an exposure time having a duration of $TE_4$, after which the material 404 continues curing even at a depth designated as 414. The process 400 then waits a break time $TB_4$ with no irradiation (e.g., ultraviolet source turned off).

At interval 5, the material 404 is irradiated for an exposure time having a duration of $TE_5$, after which the material 404 continues curing even at a depth designated as 416. The process 400 has reached the stopping condition so the process terminates, with a final cure depth 416.

In an example implementation of using the process 400 of FIG. 4 in a gradient pulsed application, the exposure time increases according to a gradient, e.g., increases by a constant value such as 5 seconds, and the break time remains constant, e.g., 5 seconds. The emitted irradiance can remain constant or vary as described more fully herein. For the example of increasing by 5 seconds, $TE_1$ is 5 seconds, $TE_2$ is 10 seconds, $TE_3$ is 15 seconds, $TE_4$ is 20 seconds, and $TE_5$ is 25 seconds, solely by way of illustration. Here, the break time remains constant, i.e., $TB_1=TB_2=TB_3=TB_4=5$ seconds by way of example. Regardless, the cure depth 416 is greater than the depth 408. Moreover, the cure depth 416 is greater than X (FIG. 1).

Figure 5:
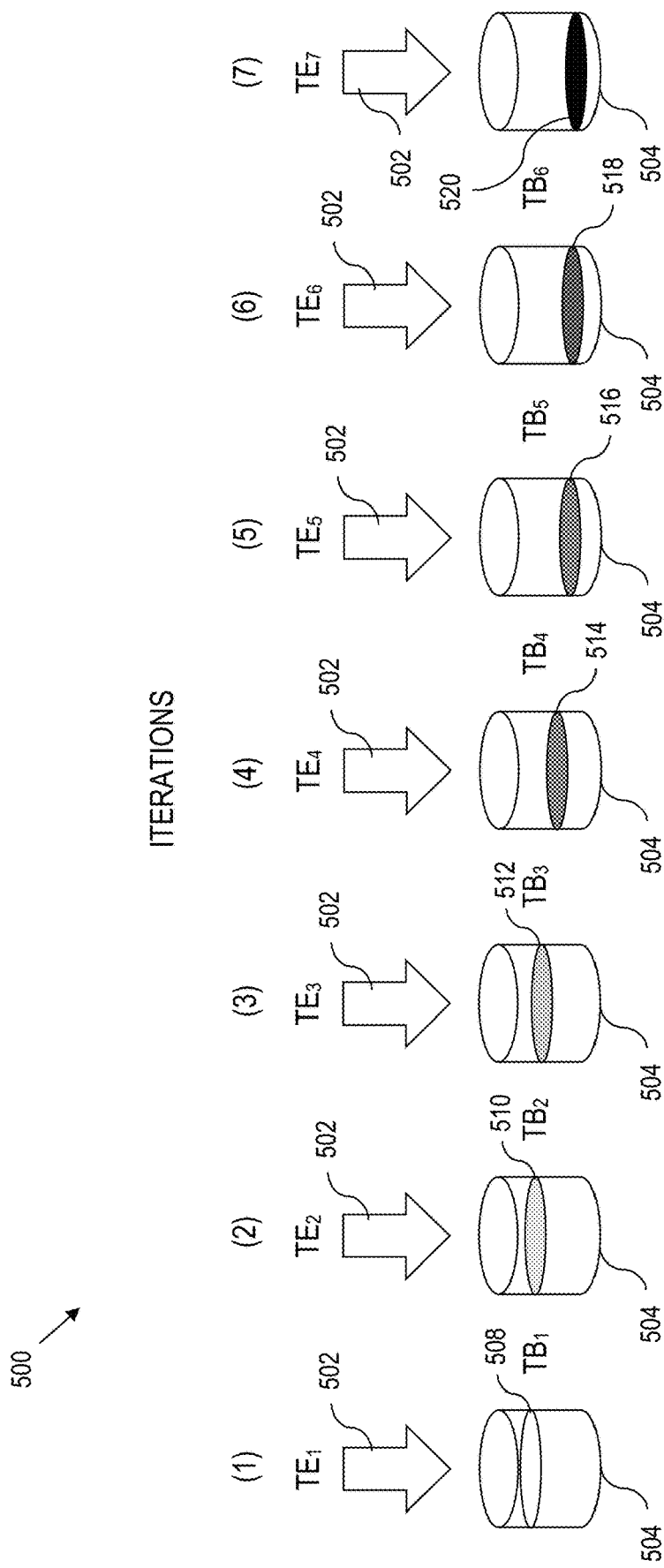
FIG. 5 is schematic diagram of another example gradient pulse, multiple iteration ultraviolet cure sequence, according to aspects of the present disclosure.

Referring to FIG. 5, another schematic example implementation of a process 500 for curing an ultraviolet curable material is illustrated. Analogous to FIG. 4, ultraviolet irradiance is designated by a downward arrow 502 directed towards a material 504. After setting the initial values for emitted irradiance, exposure time, break time, the stopping condition, combinations thereof, etc., the process 500 repeatedly performs an ultraviolet cure sequence to cure the material 504 until the stopping condition is met. Each iteration in the ultraviolet cure sequence comprises irradiating the material 504 with the ultraviolet source at the emitted irradiance for the exposure time (TE) and resting for the break time (TB) with no irradiation applied to the material 504.

At interval 1, the material 504 is irradiated for an exposure time having a duration of $TE_1$, after which the material 504 continues curing even at a depth designated as 508. The process 500 then waits a break time $TB_1$ with no irradiation (e.g., ultraviolet source turned off).

At interval 2, the material 504 is irradiated for an exposure time having a duration of $TE_2$, after which the material 504 continues curing even at a depth designated as 510. The process 500 then waits a break time $TB_2$ with no irradiation (e.g., ultraviolet source turned off).

At interval 3, the material 504 is irradiated for an exposure time having a duration of $TE_3$, after which the material 504 continues curing even at a depth designated as 512. The process 500 then waits a break time $TB_3$ with no irradiation (e.g., ultraviolet source turned off).

At interval 4, the material 504 is irradiated for an exposure time having a duration of $TE_4$, after which the material 504 continues curing even at a depth designated as 514. The process 500 then waits a break time $TB_4$ with no irradiation (e.g., ultraviolet source turned off).

At interval 5, the material 504 is irradiated for an exposure time having a duration of $TE_5$, after which the material 504 continues curing even at a depth designated as 516. The process 500 then waits a break time $TB_5$ with no irradiation (e.g., ultraviolet source turned off).

At interval 6, the material 504 is irradiated for an exposure time having a duration of $TE_6$, after which the material 504 continues curing even at a depth designated as 518. The process 500 then waits a break time $TB_6$ with no irradiation (e.g., ultraviolet source turned off).

At interval 7, the material 504 is irradiated for an exposure time having a duration of $TE_7$, after which the material 504 continues curing even at a depth designated as 520. The process 500 has reached the stopping condition so the process 500 terminates, with a final cure depth 520.

In an example of using the process 500 of FIG. 5 in a pulsed application, the exposure time varies, but the break time remains constant, e.g., 5 seconds. The emitted irradiance can remain constant or vary as described more fully herein. Regardless, the cure depth 520 is greater than the depth 508. Moreover, the cure depth 520 is greater than X (FIG. 1).

In an example, $TE_1$ is 1 second, $TE_2$ is 5 seconds, $TE_3$ is 10 seconds, $TE_4$ is 20 seconds, $TE_5$ is 30 seconds, $TE_6$ is 45 seconds, and $TE_7$ is 60 seconds solely by way of illustration.

Here, the break time remains constant, i.e., $TB_1=TB_2=TB_3=TB_4=TB_5=TB_6=5$ seconds by way of example.

The above examples are presented by way of illustration and not by way of limitation. In practice, at each interval, the emitted irradiance of the ultraviolet source, the value of the exposure time, the value of the break time, combinations thereof can change. In other embodiments, the emitted irradiance can change, even within a single iteration, e.g., via a power gradient, curve, etc.

Figure 6:
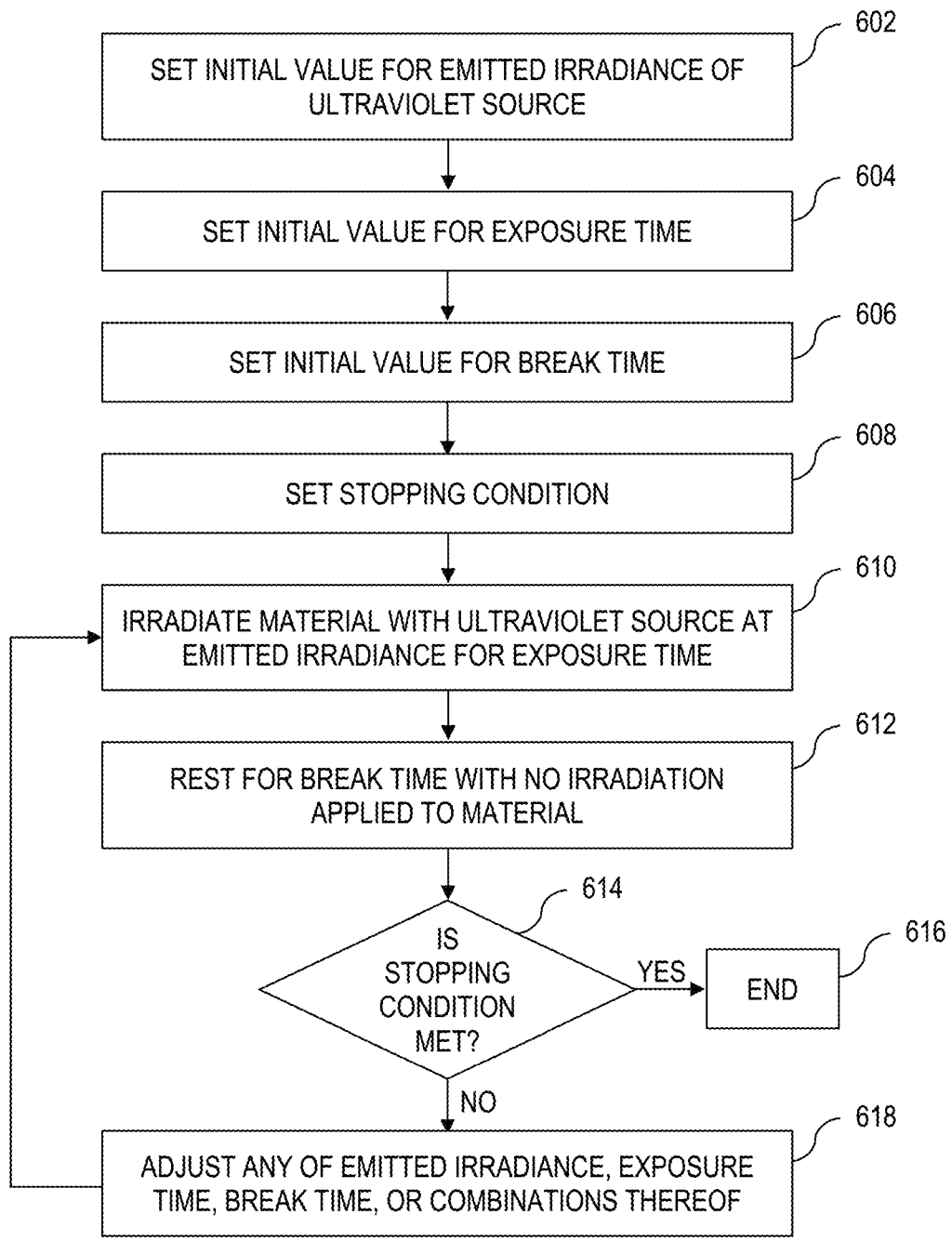
FIG. 6 is a flow chart that illustrates a process for curing materials, according to various aspects of the present disclosure.

FIG. 6 is a flow chart of a process 600 described herein. At 602, an initial value for an emitted irradiance of ultraviolet light is set. This value for the emitted irradiance may change throughout the process 600, as discussed herein. At 604, an initial value for an exposure time is set. This value for the exposure time may change throughout the process 600, as discussed herein. At 606, an initial value for a break time is set. This value for the break time may change throughout the process 600, as discussed herein. Further, at 608, a stopping condition is set.

At 610, a material is irradiated with the ultraviolet source at the emitted radiance value for the exposure time. Then, at 612, there is a resting period where there is no irradiation from the ultraviolet source applied to the material, where the rest period is for the break time value. At 614 it is determined if the stopping condition is met. If so, then the process ends at 616. Otherwise, it is determined if any of the values (emitted irradiance, exposure time, break time, or combinations thereof) need to be adjusted, as described herein. If so, the values are adjusted accordingly. Regardless of whether the values have been adjusted or allowed to remain the same, if the stopping condition is not met at 614, then the process loops back to 610. Thus, the process iterates through that loop of 610, 612, 616, and 618 until the stopping condition is met.

Miscellaneous

In an example material tested, the pulsed process herein consistently cured to around 4 mm with the DOE optimized gradient pulse cure sequence. A depth of cure of 4-5 mm is desired for dental composites, and represents an improvement over conventional art, which is approximately 2 mm as noted above. As such, aspects of the process herein can be optimized for the bulk-filled resin composites (BFRC) used in dental restorations, and may be able to achieve 4 mm or greater depth of cure. As such, the process herein should be considered as a solution to the depth of cure issues currently experienced in the curing of dental composites.

One explanation to the depth of cure issue is that current techniques cure the surface of the material too quickly and that the UV light does not penetrate through a cured "crust" causing the material below the cured surface to remain uncured. However, aspects herein allow the ultraviolet light to penetrate deeper into the material due to delayed crust formation.

According to aspects herein, gradients can be implemented in both the high-to-low exposure time pulse and the reverse low-to-high exposure time pulse. In some embodiments, a low-to-high exposure time pulse provides greater depth of cure. The low-to-high gradient pulse should be optimized within the confines of the light curing unit used.

The pulse time between light exposures can be constant, e.g., a constant 5 seconds in the examples noted above. In alternative embodiments, the pulse time between light exposure can vary, e.g., according to any defined pattern or random intervals, gradient, formula, step function, etc., as described more fully herein.

Traditional cure techniques can also be combined with the gradient pulse cure technique to push towards a depth of cure of 10 mm or beyond.

Increasing the depth of cure can find application in the additive manufacturing. For instance, it may be desirable to maximize the depth of cure of composite materials for additive manufacturing applications. The ability to improve the depth of cure will be an enabling factor to scaling up the objects being printed.

An objective of the pulse cure technique to curing ultraviolet curable bulk filled resin composites is to bypass the curing barrier (crust) that forms and prevents further depth of cure within a sample.

In some embodiments, an improvement to the depth of cure between a continuously cured material and pulse cured material can range from approximately 5.40%—approximately 6.59%. With additional optimization, improvement over a control (continuous cure) is likely to range from 8% to 10% or greater, with an increase beyond 10% being an excellent improvement.

An extension on the pulse cure technique is curing material in two phases. The first phase being the pulse cure start-up phase followed by a continuous cure phase to combine the benefit from both curing techniques while reducing the overall time to cure.

In some embodiments, the pulse cure technique may be implemented as a "pulse feature", e.g., implemented by a controller of the light system, which manages and controls the process as set out more fully herein. In some embodiments, the light may be further programmed in to the programmable cycles which allow for a predefined number of steps in the cure sequence. The pulse function could include customizable features like allowing users to specify the down time between pulses, the number of pulses, the length of each light exposure pulse, the intensity of each pulse, etc. The dose requirement needed for sufficient cure is material dependent, but with the gradient pulse cure technique and a DOE approach the process can be customized to improve the depth of cure for different materials.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A process for curing an ultraviolet curable material comprising:
    setting an initial value for an emitted irradiance of an ultraviolet source;
    setting an initial value for an exposure time of the ultraviolet source;
    setting an initial value for a break time of the ultraviolet source;
    setting a stopping condition;
    repeatedly performing an ultraviolet cure sequence to cure a material until the stopping condition is met, each iteration in the ultraviolet cure sequence comprising:
        irradiating the material with the ultraviolet source at the emitted irradiance for the exposure time;
        resting for the break time with no irradiation applied to the material; and
        adjusting a value of the break time to increase by a predetermined, fixed amount; and
        increasing the exposure time based on a predetermined fixed amount;
    wherein:
    the initial value for the exposure time does not create a crust on the material.

2. The process of claim 1 further comprising:
    adjusting a value of at least one of the emitted irradiance, the exposure time, or the break time in at least one iteration of the ultraviolet cure sequence.

3. The process of claim 2, wherein:
    adjusting the value of at least one of the emitted irradiance, the exposure time, or the break time comprises adjusting the value of the exposure time.

4. The process of claim 3, wherein:
    adjusting the value of the exposure time comprises changing the exposure time according to a predetermined formula.

5. The process of claim 3, wherein:
    adjusting the value of the exposure time comprises changing the exposure time such that for each iteration, the exposure time increases.

6. The process of claim 2, wherein:
    adjusting the value of at least one of the emitted irradiance, the exposure time, or the break time comprises adjusting the value of the emitted irradiance in at least one iteration of the ultraviolet cure sequence.

7. The process of claim 6, wherein:
    adjusting the value of the emitted irradiance comprises changing the emitted irradiance by a predetermined, fixed amount.

8. The process of claim 6, wherein:
    adjusting the value of the emitted irradiance comprises changing the emitted irradiance according to a predetermined gradient.

9. The process of claim 6, wherein:
    adjusting the value of the emitted irradiance comprises changing the emitted irradiance according to a predetermined formula.

10. The process of claim 6, wherein:
    adjusting the value of the emitted irradiance comprises changing the emitted irradiance such that for each iteration, the emitted irradiance increases.

11. The process of claim 6, wherein:
    adjusting the value of the emitted irradiance comprises changing the emitted irradiance such that for each iteration, the emitted irradiance decreases.

12. The process of claim 1, wherein:
setting the stopping condition comprises setting the stopping condition as a desired depth of cure.

13. The process of claim 1, wherein:
setting the stopping condition comprises setting the stopping condition as a predetermined number of iterations.

14. A process for curing an ultraviolet curable material comprising:
setting an initial value for an emitted irradiance of an ultraviolet source;
setting an initial value for an exposure time;
setting an initial value for a break time;
setting a stopping condition;
repeatedly performing an ultraviolet cure sequence to cure a material until the stopping condition is met, each iteration in the ultraviolet cure sequence comprising:
irradiating the material with the ultraviolet source at the emitted irradiance for the exposure time;
resting for the break time with no irradiation applied to the material;
adjusting a value of the break time to increase by a predetermined gradient; and
linearly increasing the exposure time;
wherein:
the initial value for the exposure time does not create a crust on the material.

15. A process for curing an ultraviolet curable material comprising:
setting an initial value for an emitted irradiance of an ultraviolet source;
setting an initial value for an exposure time;
setting an initial value for a break time;
setting a stopping condition;
repeatedly performing an ultraviolet cure sequence to cure a material until the stopping condition is met, each iteration in the ultraviolet cure sequence comprising:
irradiating the material with the ultraviolet source at the emitted irradiance for the exposure time;
resting for the break time with no irradiation applied to the material;
adjusting a value of the break time to increase by a predetermined formula; and
linearly increasing the exposure time;
wherein:
the initial value for the exposure time does not create a crust on the material.

* * * * *